United States Patent Office 3,281,475
Patented Oct. 25, 1966

3,281,475
PROCESS FOR PREPARING OLEFIN-TERMINATED ALKYLPHENOXYPOLYETHOXYETHANOLS
Fred E. Boettner, Huntingdon Valley, and Robert M. Ross, Plymouth Meeting, Pa., assignors to Rohm & Haas Company, Philadelphia, Pa., a corporation of Delaware
No Drawing. Filed Feb. 6, 1962, Ser. No. 171,363
7 Claims. (Cl. 260—613)

This invention relates to nonionic surface-active agents which are relatively chemically inert and highly stable towards alkali, and to a process by which they are prepared.

These agents have the chemical structure $$RO(CH_2CH_2O)_xR'$$

wherein R is an n-alkyl, branched alkyl or alkyl-phenyl group, and R' is a tert.-alkyl group or alicyclic hydrocarbon radical.

These compositions are prepared by mixing together compounds of the type $RO(CH_2CH_2O)_xOH$ with tertiary olefins having from four to twelve carbon atoms, and then contacting the mixture with an anhydrous macroreticular resinous polysulfonic acid at temperatures ranging from about 0° to 70° C. and at atmospheric or autogenous pressure. After the reactants have been in contact with the catalyst for a sufficient length of time to obtain the desired degree of etherification, the catalyst is removed. Any traces of acidic materials leached out of the catalyst are neutralized by the addition of a base. Any unreacted olefin is then separated by distillation or solvent extraction, leaving the product and any unreacted starting alcohol. The product may be further purified by solvent extraction or other means to remove unreacted starting alcohol.

The preparation of ethers by the reaction of olefins with alcohols in the presence of an acid catalyst has been well known. But the etherification of the high molecular weight surface active agents of the polyoxyethanol type heretofore has been difficult, and sometimes impossible to accomplish with conventional sulfonic acid ion exchange resins or with homogeneous acid catalysts like p-toluene sulfonic acid. Now, however, with the aid of newly developed macro-reticular sulfonic acid ion-exchange resins, it is possible readily to etherify the high molecular weight surface active agents of the polyoxyethanol type, as disclosed herein.

The principal and preferred products of this invention are the t-butyl ethers of octylphenoxypolyethoxyethanols having an average of about 9 to 13 oxyethylene units, and the camphene ethers of octylphenoxyethanols having an average of about 25 to 35 oxyethylene units. Both of these types of products are characterized by their high resistance to oxidative degradation when formulated with strongly alkaline materials like solid NaOH or KOH. They are also low foaming compounds which have an excellent defoaming action, and they are therefore highly useful in such applications as mechanical dishwashers and metal cleaning operations. The compounds likewise have utility as wetting agents and detergents in textile processing, and also as detergents for cleaning non-porous surfaces. Their general usefulness as non-ionic surface-active agents is not impaired by the presence of the t-alkyl or terpenyl groups.

The method of preparing these products utilizes the "termination" reaction of nonionics, i.e. removal of the terminal hydroxyl group by conversion to an ether linkage. Most termination reactions are difficult to make go to completion as they are carried out by the well-known Williamson synthesis method, i.e. reaction of the sodium alkoxide derivative of the nonionic with a reactive chlorine compound such as the following:

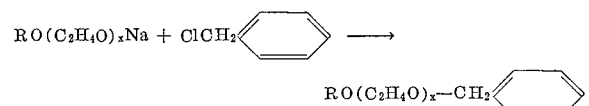

This type of reaction, which is disclosed in U.S. Patent 2,856,434, seldom goes to completion (no hydroxyl number); in fact, such products are generally about 80–85% terminated. The remaining 15–20% unterminated nonionic contributes to the instability of the final product on solid caustic.

Materials of even 90–95% purity shown a barely visible, but definite degree of discoloration. As the degree of etherification decreases the degree of degradation, as shown by discoloration, increases. Proof that the t-alkyl ethers of the present invention are substantially fully terminated, and thereby highly resistant to degradation by caustic, is readily demonstrated by mixing two parts of the etherified material with ninety-eight parts of solid NaOH and allowing the mixture to stand for a few weeks. The essentially completely etherified products, as the t-alkyl ethers of the present invention, show no discoloration; by comparison, products which are identical except for their lack of such complete etherification, discolor rapidly. The terpenyl ethers of the present invention are somewhat more difficult to produce directly in a substantially fully terminated form, but as the impurities (unterminated products) are generally no more than 10%, there is no problem in eliminating them by conventional purification techniques so as to leave only the substantially etherified products.

The novel compositions of matter which are prepared in accordance with the present invention are compounds of the type generally represented by the formula $$RO(CH_2CH_2O)_xR'$$

in which
R = a hydrocarbon radical selected from the group consisting of (1) straight and branched chain $C_8$–$C_{18}$ alkyl radicals, (2) straight and branched chain $C_8$–$C_{18}$ alkenyl radicals, and (3) mono and dialkylphenyl radicals containing 10 to 24 carbon atoms;
$x = 7$ to 50 (all numbers for the oxyethylene units throughout this specification refer to an average for the particular composition);
R' = a hydrocarbon radical selected from the group consisting of (1) tertiary $C_4$–$C_{12}$ alkyl groups; (2) and alicyclic radicals of the formula $C_{10}H_{17}$ derived from monoterpenes, in particular for the $C_{10}H_{17}$ radical (believed to be isobornyl) which is derived from camphene.

Preferred compositions are those in which: R is p-t-octylphenyl, p-nonylphenyl, p-dodecylphenyl, n-dodecyl, n- octadecyl, or tridecyl; R' is either t-butyl or isobornyl; and $x$ is 9 to 35.

Variations of the novel method of the present invention are shown in the numerous examples given below. To illustrate the scope of the method, with respect to the different types of reactants used, Examples 1–3, respectively, show reactions of a gaseous olefin with a liquid alcohol, a gaseous olefin with a solid alcohol, and a nonvolatile olefin with a liquid alcohol. In each of these examples the catalyst employed is Amberlyst 15, a macroreticular structured sulfonated styrene-divinylbenzene copolymer in the dehydrated acid form. This catalyst, a product of the Rohm & Haas Company, Philadelphia, Pennsylvania, is more fully disclosed in Belgian Patent 590,370, which is herein incorporated by reference.

EXAMPLE 1

Into the bottom portion of a 2-liter-Parr stirring autoclave (stainless steel) charge 453.4 g. (0.5 mol.) of a reaction product of octylphenol and 16 moles of ethylene oxide, and 35 g. of Amberlyst 15 which had previously been dried for 16 hours at 70° C. under an absolute pressure of 0.5 mm. Place the head of the autoclave in place and seal the autoclave. After sealing the autoclave, connect the autoclave to the vacuum source and reduce pressure to 10–20 mm. on the autoclave. Place the autoclave in the heating jacket and connect the stirrer to the stirring motor. While stirring rapidly charge 326 g. (5.81 mols.) isobutylene either as a gas, by connecting the autoclave directly to the isobutylene cylinder (takes about four hours), or as a liquid, by charging the desired amount of liquid isobutylene to a small (one liter) "breathing oxygen" type cylinder and then transferring this liquid isobutylene to the evacuated autoclave. After transfer of the isobutylene stir the autoclave at room temperature for 18–20 hours. (The pressure will be maintained at 25–30 p.s.i.g. during this time.) At the end of this holding period vent the autoclave through a tared Dry Ice-trap to collect the unreacted isobutylene to atmospheric pressure. Open the autoclave and transfer the reaction mixtures to a filter funnel to remove the beads from the product. Wash the beads with isopropanol and combine the isopropanol with the product. Neutralize this solution (pH 1–2) to a pH of 7–8 by adding alcoholic NaOH with good stirring. (This is done to neutralize the small amount of polymeric sulfonic acid leached from the beads of Amberlyst 15 during the reaction.) Strip the isopropanol solution of the product on the steam bath first under reduced pressure (10–20 mm.) and then under high vacuum (less than 0.1 mm.). The product, 453.8 g. (99.6% yield), was a very light yellow colored (#2 on the Varnish Color Scale) liquid having a cloud point (1% in deionized water) of 47.5° C. and having no hydroxyl number, indicating complete etherification.

EXAMPLE 2

In a suitable container (two liter beaker) dissolve 637 g. (0.4 mol.) stearyl-$E_{30}$ in 300 ml. of dry dioxane (dried over anhydrous $MgSO_4$) with heating and stirring. When the stearyl $E_{30}$ is completely dissolved transfer this warm (ca. 30–35° C.) solution to the bottom portion of a Parr stirring autoclave (two liter capacity) and then add 100 g. of dry Amberlyst 15 and seal and evacuate the autoclave as in Example 1.

By means of the small "breathing oxygen" cylinder charge 307.5 g. (5.48 mols) of liquid isobutylene to the evacuated autoclave. When all of the isobutylene is transferred to the autoclave stir the autoclave at 30–33° C. for 24 hours. During this time the pressure will drop from about 36 p.s.i.g. to about 10 p.s.i.g. At the end of this holding period vent the autoclave to atmospheric pressure through a tared Dry Ice trap to recover the unreacted isobutylene. Open the autoclave and remove the reaction mixture from the autoclave and filter the mixture in order to remove the catalyst. Wash the beads from the reactor with isopropanol and wash the beads on the filter with isopropanol. Combine the isopropanol with the product and neutralize it to a pH of 7–8 by the addition of alcoholic NaOH. Strip the neutralized isopropanol solution on the steam bath under reduced pressure (10–20 mm.) and then under high vacuum (less than 0.1 mm.). The product (615 g., 93.3% yield) was a light tan colored solid (M.P. 50–54° C.) having a cloud point of 77.5° C. and a hydroxyl number of 1.6, indicating that it is 95.5% terminated.

EXAMPLE 3

In a one-liter three-necked flask equipped with a mechanical stirrer, a thermometer and a reflux condenser place 228.7 g. (0.153 mol.) dodecylphenol-$E_{28}$, 35 g. dry Amberlyst 15 (dried as in Example 1), and 282.5 g. (2.0 mols.) camphene. Heat this mixture at 50–55° C. with stirring for 72 hours. At the end of this time, cool the mixture to room temperature, filter to remove the beads, dilute the filtrate with isopropanol and neutralize the mixture to 7–8 by the addition of alcoholic NaOH. Strip the neutralized isopropanol solution under reduced pressure (10–20 mm.) and then under high vacuum (less than 0.1 mm.) on the steam bath. Filter the hot residue. The product was a light yellow (amber) solid (236.3 g., 99.6% yield) having a cloud point of 7.5° C. and a hydroxyl number of 0.50 indicating that it was 99% terminated.

A key to the unique method and composition of the present invention resides in the use of the proper catalyst. The catalysts employed in the prior art to react olefins and alcohols to form ethers, such as para-toluene sulfonic acid, sulfuric acid, boron fluoride etherate, and conventional non-phase separated (i.e. non-macroreticular structured) sulfonic acid ion exchange resin, etc., are unable to function satisfactorily.

The conventional homogeneous acid catalysts, such as p-toluene sulfonic acid, give much slower reaction rates, even when very large amounts of catalyst are used. As a result, side reactions such as olefin polymerization take place, making it difficult to push the etherification reaction to completion. Homogeneous catalysts also cause problems in catalyst removal, since they are not easily separated from the reaction mixture.

Table I illustrates the superiority of the macroreticular resin catalysts in catalyzing two typical etherification reactions. It is to be noted that the reaction of isobutylene with $OPE_{16}$ (the reaction product of octylphenol and 16 moles of ethylene oxide) was substantially complete when the macroreticular resin was used. By contrast the product obtained when the homogeneous catalyst was employed was so poor that it could be put to commercial use only after an expensive purification procedure to remove large amounts of unreacted starting material. Likewise, the reaction of camphene with $OPE_{35}$ (the reaction product of octylphenol and 35 moles of ethylene oxide) occurred only to a minor extent when the homogeneous catalyst was used. By comparison, the same reaction was 90% complete when the macroreticular catalyst was used.

Even more striking is the comparison of the products obtained by use of the macroreticular resin catalysts with those obtained when conventional sulfonic acid resins are employed. Though the latter resins act as catalysts in many organic reactions, it is surprising to find that for all practical purposes they are inert in catalyzing the etherification of the relatively high molecular weight alcohols which are of interest in the present invention. This is shown in the comparison of the last two items in Table I where isobutylene is shown as having been reacted with the reaction product of dodecylphenol and 12.5 moles of ethylene oxide.

TABLE I.—COMPARISON OF CATALYSTS

| Alcohol | Olefin (mols) | Gms. Catalyst/ Mol Alcohol | Reaction Time (hrs.) | Temp., °C. | Catalyst | Percent Terminated |
|---|---|---|---|---|---|---|
| $OPE_{15.5}$ | Isobutylene (10.6) | 65 | 24 | 25 | Amberlyst 15 | 99.6 |
| $OPE_{16}$ | Isobutylene (17.2) | 95 | 24 | 25 | p-Toluene sulfonic acid | 72.4 |
| $OPE_{35}$ | Camphene (5) | 100 | 48 | 55 | Amberlyst 15 | 89.9 |
| $OPE_{35}$ | Camphene (10) | 100 | 72 | 60 | p-Toluene sulfonic acid | 10.2 |
| Dodecylphenol $E_{12.5}$ | Isobutylene (11) | 100 | 48 | 25 | Amberlyst 15 | 98.9 |
| Dodecylphenol $E_{12.5}$ | Isobutylene (11) | 364 | 48 | 25 | Amberlite XE-77 H* | 0.0 |

NOTES: OPE=octylphenoxyethoxy; $E^{15.5}$=1505 ethoxy units; Amberlite XE-77 H*=the hydrogen form of a non-phase separated sulfonic acid ion-exchange resin sold by the Rohm & Haas Company, Philadelphia, Pennsylvania.

The amount of catalyst needed may vary with the olefins or the alcohols used, and the particular conditions of a given reaction. It should be sufficient to catalyze the reaction, of course, and there is no concern with regard to the possibility of an excess being used. An excess cannot harm the reaction, and since the catalyst is an insoluble material which can be re-used a number of times, there is no economic problem regarding possible waste of the material.

Not all olefins can perform satisfactorily in the method of the present invention. Only isobutylene and camphene give quantitative or nearly quantitative conversions to the corresponding t-alkyl and terpenyl ethers. However, other tertiary olefins having 12 or less carbon atoms and other monoterpenes have given partial reaction to the extent that the completely etherified product could be isolated by conventional purification procedures. But, by contrast, secondary olefins such as propylene and cyclohexene either did not react at all or reacted to such a slight extent that it was not possible to prove their formation by analysis or by isolation of the sec-alkyl ethers.

Although stability towards alkali was a primary objective in the development of the present compositions, it was also important that they should be good surfactants and should be low-foamers when etherified. For this reason the alcohols employed are all of the $RO(C_2H_4O)_xH$ (ethylene oxide adducts) type, where R is alkyl, alkenyl or alkyl phenyl. As indicated above, prior to the discovery of the catalyst employed herein it was practically impossible to carry out the etherification reaction and obtain substantially complete etherification (complete termination) of the alcohol. As reported in U.S. Patents 2,480,940 and 2,561,254, which disclose the use of non-macroreticular structured sulfonated ion exchange resin catalysts in reactions of olefins and alcohols, the higher alcohols (above C5–6) reacted only sluggishly, if at all. Table II compares the reactions of a number of different alcohols with isobutylene, and Table III compares the reactions of a number of different alcohols with camphene, to show how well the method of the present invention operates, in every case using Amberlyst 15 as the catalyst.

TABLE II.—COMPARISON OF VARIOUS ALCOHOLS REACTED WITH ISOBUTYLENE

| Alcohol: | Percent terminated |
|---|---|
| $OPE_{7.5}$ | 100.0 |
| $OPE_{8.5}$ | 100.0 |
| $OPE_{9.7}$ | 100.0 |
| $OPE_{12.5}$ | 96.1 |
| $OPE_{15.9}$ | 100.0 |
| $OPE_{40}$ | 98.0 |
| Methanol | 100.0 |
| Isopropanol | 100.0 |
| Dodecyl-$EO_5$ | 100.0 |
| Dodecyl-$EO_{10}$ | 95.4 |
| Dodecyl-$EO_{15}$ | 95.3 |
| Dodecylphenol-$EO_{12.5}$ | 98.5 |
| Stearyl-$EO_5$ | 97.2 |
| Stearyl-$EO_{10}$ | 92.5 |
| Stearyl-$EO_{20}$ | 100.0 |
| Stearyl-$EO_{30}$ | 95.5 |
| n-octyl alcohol | 97.1 |
| Nonylphenol-$EO_9$ | 99.1 |

TABLE III.—COMPARISON OF VARIOUS ALCOHOLS REACTED WITH CAMPHENE

| Alcohol | Percent terminated |
|---|---|
| $OPE_{15.6}$ | 96.1 |
| $OPE_{16}$ | 94.6 |
| $OPE_{20}$ | 94.8 |
| $OPE_{25}$ | 94.7 |
| Dodecylphenol-$EO_{28}$ | 98.7 |
| n-octyl alcohol | 99.5 |
| n-butanol | 98.0 |
| n-methanol | 99.0 |
| Isopropanol | 100.0 |

NOTES.—In both Tables II and III, "OPE" is the abbreviation for octylphenoxyethanol, and such designations as "E" or "$EO_{12.5}$" identify the number of oxyethylene units present.

Vairous conditions for the reactions have been studied. Regarding pressure, atmospheric conditions are suitable in reactions of olefins, having boiling points above 25–30°. With low boiling point olefins, a suitable pressure vessel is required, and pressures on the order of 10–30 p.s.i.g. may suitably be employed. Actually, the principal requirement is to have enough pressure to keep an excess of the olefin dissolved in the alcohol.

Regarding temperatures, reactions using low boiling olefins such as isobutylene are best carried out at about 20–27° C. Higher temperatures make the reaction go faster, but temperatures much above 50° C. should be avoided as they give rise to dimerization of the olefin. The reactions using camphene are best carried out at about 50–60° C. Lower temperatures undesirably slow down the reaction, and higher temperatures in the neighborhood of 80–100° C. may adversely affect the catalyst.

Since the novel process is an equilibrium reaction, an excess of olefin is helpful in driving the reaction to completion. At least two mols of the olefin per mol of alcohol generally are required to give the desired degree of etherification.

With regard to the utility and performance of the novel products, it was pointed out above that their resistance to alkali was their most outstanding virtue. However, they are of considerable value because of their ability to reduce considerably the degree of foaming in mechanical dishwashing and other applications conducive to foam formation. Many of them also are highly effective food soil defoamers. These three major properties are well illustrated in Tables IV and V, but before referring to them an explanation of what is meant by the foaming and defoaming tests therein cited may be in order.

For testing foam it is common to use what is known as the "Hamilton-Beach Foam Test" which is performed as follows. A Hamilton-Beach electrically driven mixing apparatus is inserted into a glass tube which is sealed at its bottom end. In the tube are four stainless steel baffle plates held vertically. The glass tube is immersed in a water bath which maintains the temperature within 0.5° C. of the particular test temperature. The mixer blades are centered in the tube with the upper blade ½ inch above the solution surface. The 200 ml. of 0.1% test solution is equilibrated to temperature and then mixed at high speed (14,500 r.p.m.) for three minutes. The mixer is stopped and the foam height recorded after five seconds. A foam height of less than 5.5 cm. is considered acceptable, and anything over that value is deemed unacceptable. Each test usually is run in duplicate.

The ability of surfactants to defoam food soil is an important characteristic in the application thereof to mechanical dishwashing. The presence of any air in the water spray employed in such machines reduces their mechanical efficiency by decreasing the impact of the spray on the substrates. A spray of lower force than that which the machine is designed to apply would not be as effective in removing food particles. Serious foaming problems are caused by proteinaceous foods such as egg, milk, and flour, which cause relatively large quantities of air to be trapped in the water spray. At higher concentrations, foam may also be caused by fatty or oily soils.

The food soil defoaming test is performed with a dishwasher, such as the commercially well-known Kitchen Aid apparatus, in which the speed of the rotor is a function of the quantity and character of foam. Foam pumped into the rotor imparts less momentum to the rotor upon leaving than would water without air and hence the rotor moves more slowly.

The detergent containing the surfactant under test is added to the machine, and the machine is allowed to fill with water. When the spray begins, the machine is momentarily stopped, beaten whole fresh egg or other soil is added, and then the spray is allowed to continue. After 2, 3 and 4 minutes, the revolutions of the spray rotor are counted over a 30-second period. The reported r.p.m. number is the average of these three determinations. The degree of defoaming is determined by comparing the r.p.m. when there is no egg and therefore no foam present, with the lowered r.p.m. when the egg is added.

The following examples will further illustrate the nature of the present invention. It should be understood, however, that all of the examples, tables, and other data set forth herein are merely illustrative and not necessarily limiting with regard to the nature of the invention.

EXAMPLE 4

Into a two-liter stainless steel, stirred autoclave were charged 626 parts (1.0 mol) of a reaction product of dodecanol-1 and 10 mols of ethylene oxide, the average composition of which can be expressed by the formula $n-C_{12}H_{25}(OCH_2CH_2)_{10}OH$, 100 parts of Amberlyst 15, which had been dried previously for 16 hours at an absolute pressure of 0.5 mm., and 627 grams (11.2 mols) of liquid isobutylene. The autoclave was closed and the contents stirred at 30° to 38° C. for 22 hours. At the end of this time, the autoclave was opened and the excess isobutylene was allowed to boil off. The contents of the autoclave were then filtered to separate the product from the catalyst beads. The beads were washed once with 200 ml. of isopropyl alcohol, which was combined with the filtered product. The product solution was neutralized to pH 7 with a little dilute sodium hydroxide solution and was then stripped at 15 mm. pressure and 100° C. Six hundred eighty parts of light amber oil were obtained. The oil had a hydroxyl number of 4, a cloud point at 1% in water of 42° C. and showed no discoloration when 2 parts were mixed with 98 parts of powdered sodium hydroxide and placed in a closed jar for three weeks. The starting material, the reaction product of dodecanol-1 and 10 mols of ethylene oxide, had a cloud point at 1% in water of 93° C., a hydroxyl number of 90 and turned dark brown in the alkali-stability test.

EXAMPLE 5

Into a two-liter stainless steel autoclave were charged 596 parts (0.25 mol) of a reaction product of 50 mols of ethylene oxide with dodecanol-1, 300 parts of anhydrous dioxane, 100 parts of dry Amberlyst 15, and 168 parts (3.0 mols) of isobutylene. After 24 hours stirring at 25–30° C., the product was worked up as described TABLE IV.—COMPARISON OF FOAMING AND DEFOAMING PROPERTIES OF OLEFIN-TERMINATED AND NON-TERMINATED SURFACTANTS

| EO Adduct | Unterminated | | Group | Terminated | |
|---|---|---|---|---|---|
| | Foam [1] cm. | Defoaming Food Soil [2] Rotor Speed | | Foam [1] cm. | Defoaming [2] r.p.m. |
| $t-C_8H_{17}C_6H_4O(CH_2CH_2O)_{7.5}H$ | 8.3 | | t-Butyl | 0.0 | |
| $t-C_8H_{17}C_6H_4O(CH_2CH_2O)_{10}H$ | >13.0 | 11 | t-Butyl | 0.3 | 76 |
| $t-C_8H_{17}C_6H_4O(CH_2CH_2O)_{16}H$ | >13.0 | | t-Butyl | 5.3 | |
| $t-C_8H_{17}C_6H_4O(CH_2CH_2O)_{25}H$ | >13.0 | 2 | Isobornyl | 2.8 | 82 |
| $t-C_{12}H_{25}C_6H_4O(CH_2CH_2O)_{12.5}H$ | >13.0 | 1 | t-Butyl | 2.3 | 85 |
| $n-C_{12}H_{25}O(CH_2CH_2O)_{10}H$ | >13.0 | | t-Butyl | 5.3 | |

[1] Hamilton Beach Test, 0.1% surfactant, 50° C., cm. of entrapped air after five seconds.
[2] Kitchen Aid Dishwasher, r.p.m. of rotor is a function of foam; with 0.11% whole egg and 0.3% NaOH at 130° F., considerable foam is produced and rotor is slowed to about 25 r.p.m.; without egg and thus with no foam, about 80 r.p.m. is observed. These tests were run with 0.01% surfactant.

In Table V the data show that an olefin-terminated ethylene oxide adduct, $OPE_{12.5}$ t-butyl, is stable when stored on solid caustic. No significant loss of defoaming effectiveness is observed after the severe storage conditions of 40 days in an open jar at 60° C.

TABLE V.—STABILITY OF OLEFIN-TERMINATED SURFACTANT TO CAUSTIC

| Storage Conditions | Percent Surfactant in Dishwasher | R.p.m.[1] |
|---|---|---|
| Initial, before storage | 0.000 | 25 |
| Initial, before storage | 0.005 | 51 |
| | 0.006 | 61 |
| 2% on NaOH, 17 days, open 60° C | 0.006 | 58 |
| 2% on NaOH, 40 days, open 60° C | 0.006 | 59 |

NOTE: [1] Kitchen Aid rotor speed, 0.3% NaOH, 0.11% whole egg, 125–135° F., average r.p.m. over five minute wash cycle.

in Example 1. The product weighed 610 grams, had a hydroxyl number of 2, and was stable to alkali. It was a waxy material, melting at 45–50° C.

EXAMPLE 6

In a two-liter beaker containing 300 parts of dry dioxane were dissolved 637 parts (0.4 mol) of a reaction product of a commercial grade of n-octadecyl alcohol (Dytol E–46) with 30 mols of ethylene oxide. The warm solution (30–35° C.) was poured into a two-liter stirred autoclave. One hundred parts of dried Amberlyst 15 and 307.5 parts (5.48 mols) of liquid isobutylene were added. The autoclave was stirred at 30–33° C. for 24 hours. During this time, the gauge pressure dropped from 36 lbs./sq. inch to 10 lbs./sq. inch. The autoclave was then vented through a Dry-Ice trap to recover the unreacted isobutylene. The product was worked up as in Example 1, giving 615 grams of an amber oil which, on cooling, solidified to a light tan colored solid. The product had a cloud point of 77.5° C. and a hydroxyl number of 1.6, indicating that it is 95% terminated. It did not discolor when five parts of product were mixed with 95 parts of powdered NaOH and placed in an oven at 60° C. for 24 hours. Under the same conditions, the mixture of NaOH with the reaction product of n-octadecyl alcohol and 30 mols of ethylene oxide became tan in color.

EXAMPLE 7

Under conditions similar to those used in Example 4, the following t-butyl ethers were prepared:

*Oxyethylated reaction product*

| Alcohol | Mols ethylene oxide |
|---|---|
| n-Octyl alcohol | 7 |
| n-Octyl alcohol | 20 |
| n-Octyl alcohol | 50 |
| Tridecyl alcohol (a commercial branched chain product prepared by hydroformylation of propylene tetramer) | 10 |
| Hexadecyl alcohol (a commercial branched chain alcohol) | 10 |
| Oleyl alcohol | 20 |
| 5,5,7,7-tetramethyl-2-octenol | 10 |

In all cases, the starting materials showed discoloration in the alkali stability test, while the finished t-butyl ethers did not discolor.

EXAMPLE 8

Six hundred forty-six parts (1.0 mol) of a reaction product of 10 mols of ethylene oxide with t-octylphenol were placed in a two-liter, three-neck flask equipped with a mechanical stirrer, an inlet tube and a vent tube connected to a manometer. One hundred three grams of dried Amberlyst 15 were added. The inlet tube was connected to an isobutylene cylinder and isobutylene was admitted to the flask slowly until gauge pressure reached 9 lbs./sq. inch. Stirring was then started. The temperature was maintained between 26 and 39° C., while maintaining a pressure of 9 lbs./sq. inch. At the end of eight hours the weight gain of the flask was 112 grams, indicating that 2.0 mols of isobutylene had been reacted or was dissolved in reaction mixture. The isobutylene valve was then shut off, and stirring was continued for an additional 16 hours. At the end of this time the gauge pressure had fallen to zero.

The contents of the flask were worked up as in Example 1. A practically quantitative yield of 700 grams of product was obtained, having a hydroxyl number of 5. It had a cloud point at 1% of 22° C. and was stable to discoloration on alkali. The orginal octylphenol-ethylene oxide reaction product turned dark brown in the alkali stability test. A by-product identified as diisobutylene was obtained in the final stripping of the reaction product.

EXAMPLE 9

Six hundred forty-six parts of the same octylphenol-ethylene oxide reaction product used in Example 8, sixty-five parts of dried Amberlyst 15 and 280 parts (5 mols) of isobutylene were stirred in a two-liter stainless steel autoclave and samples were removed at 2 hours, 4 hours, 6 hours, and 10 hours. These were worked up, as in Example 4, with the following results:

| Sample | Hydroxyl No. | Percent Etherified (from OH No.) | Discoloration on Alkali (as in Example 1) |
|---|---|---|---|
| 2 hours | 46 | 55 | Dark. |
| 4 hours | 8 | 89 | Light tan. |
| 6 hours | 2 | 98 | No discoloration. |
| 10 hours | 1 | 99 | No discoloration. |

EXAMPLE 10

A reaction product of 7 mols of ethylene oxide with octylphenol (514 parts or 1.0 mol of reaction product), 50 g. of dried Amberlyst 15, and 302 grams of isobutylene were agitated 23 hours in an autoclave at 25° C. The product was completely converted to the t-butyl ether and had a cloud point at 1% in water of 1° C., whereas the starting material had a cloud point of 24° C. The product did not discolor on NaOH or KOH, whereas the starting material rapidly turned brown.

The procedure was repeated with products containing 16, 30, and 40 mols of ethylene oxide. The products did not discolor when exposed to the alkali stability test.

EXAMPLE 11

802 g. t—$C_{12}H_{25}$—⟨⟩—$(OCH_2CH_2)_{12.5}OH$ 65 g. Amberlyst 15
560 g. isobutylene
Same procedure as in Example 1.

EXAMPLE 12

660 g. t—$C_9H_{19}$—⟨⟩—$(OCH_2CH_2)_{10}OH$ 50 g. Amberlyst 15
168 g. isobutylene
Same procedure as in Example 1.

EXAMPLE 13

786 g. sec.—$C_{18}H_{37}$—⟨⟩—$(OCH_2CH_2)_{10}OH$ 100 g. Amberlyst 15
168 g. isobutylene
Same procedure as in Example 1.

EXAMPLE 14

742 g. $C_9H_{19}$—⟨⟩($C_9H_{19}$)—$(OCH_2CH_2)_9OH$ 83 g. Amberlyst 15
600 g. isobutylene
Same procedure as in Example 1.

EXAMPLE 15

880 g. t—$C_8H_{17}$—⟨⟩($CH_3$)—$(OCH_2CH_2)_{15}OH$ 80 g. Amberlyst 15
280 g. isobutylene
Same procedure as in Example 1.

EXAMPLE 16

A mixture of 910 parts of

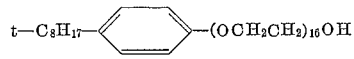

t—$C_8H_{17}$—⟨⟩—$(OCH_2CH_2)_{15}OH$ 125 parts Amberlyst 15, and 240 parts of a commercially available mixture of pentenes was stirred 100 hours at 25–40° C. in an autoclave. After neutralizing a small amount of soluble acid which was leached from the resin, the excess pentene was removed, leaving 935 parts of a pale amber liquid which had a hydroxyl number of 30. It consisted of about 50% of the tert-amyl ether and 50% of unreacted starting material.

EXAMPLE 17

One hundred grams of the product from Example 16 were mixed with 250 grams of toluene, 250 grams of heptane, 240 grams of isopropyl alcohol and 500 grams of water. After being well agitated the mixture was allowed to separate into layers at 35° C. The upper and lower layers were withdrawn separately and stripped under vacuum to remove solvent. The product from the upper layer, consisting of the purified t-amyl ether, weighed 47 grams. The product from the lower layer, consisting mainly of unreacted octylphenol-$E_{16}$ weighed 50 grams. A comparison of properties of these materials and the crude starting material follows.

|   | Cloud Point (1% in $H_2O$) | HO No. | Color on Solid NaOH |
|---|---|---|---|
| A. (Crude starting material) from Example 17. | 61.5° C | 30 | Tan. |
| B. (Purified t-amyl ether) | 38° C | 3 | White. |
| C. (Unreacted $OPE_{16}$) | 95° C | 60 | Tan. |

EXAMPLE 18

756 grams of

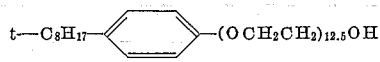

280 g. of diisobutylene and 130 grams of Amberlyst 15 were heated and stirred 72 hours at 105–110°, and stripped to remove excess diisobutylene. The product contained, by analysis, only 32% of unreacted starting material, the remainder being etherified.

EXAMPLE 19

114.2 grams (0.1 mol) of a reaction product of 20 mols of ethylene oxide with dodecylphenol, 125 g. Amberlyst 15, and 168 grams of propylene tetramer ($C_{12}H_{24}$, 1.0 mol) were heated 48 hours at 55–65° C. with agitation. The unreacted olefin was then removed under vacuum. The product had a hydroxyl number of 33, compared to a starting hydroxyl number of 49, indicating partial conversion to the ether.

EXAMPLE 20

In a one-liter, three necked flask equipped with a mechanical stirrer, a thermometer, and a reflux condenser were placed 229 grams (0.153 mol) of dodecylphenol-$E_{28}$, 35 grams of dry Amberlyst 15, and 282.5 grams (2.0 mols) of camphene. The mixture was heated with stirring for 72 hours. At the end of this time, the mixture was cooled and filtered to remove the catalyst beads, neutralized to pH 7.5 by addition of 2.0 grams of 10% alcoholic NaOH, and stripped at a final temperature of 100° C. and a pressure of 0.1 mm. The finished product weighed 236 grams, had a cloud point of 7.5° C. and a hydroxyl number of 0.5, indicating that it was 99% terminated. The product remained white when mixed with solid NaOH, whereas the starting material rapidly turned brown.

EXAMPLE 21

$OPE_{16}$ (227 grams, 0.25 mol), Amberlyst 15 (40 grams) and alpha-methylstyrene (295 grams, 2.5 mols) were stirred 120 hours at 25° C. After neutralization and removal of unreacted alpha-methyl styrene, the product was an amber oil with a cloud point of 59° C. at 1%, and a hydroxyl number of 26, indicating about 59% etherification.

EXAMPLE 22

One hundred grams of the product from Example 21 was purified by the procedure of Example 17. Yield was 51 grams of purified alpha-methylbenzyl ether and 41 grams of unreacted octylphenol $E_{16}$. A comparison of properties of these materials follows:

|   | Cloud Point (1% in water) | OH No. | Color on Solid NaOH |
|---|---|---|---|
| A. (Crude starting material) from Example 21). | 57° C | 26 | Tan. |
| B. (Purified α-methylbenzyl ether. | 4° C | 8 | Very light tan. |
| C. (Unreacted $OPE_{16}$) | 96° C | 60 | Tan. |

Fraction B was put through the extraction procedure once more, giving 40 grams of further refined product which did not discolor on NaOH.

EXAMPLE 23

Five hundred seventy grams (1.0 mol) of an adduct of octanol-2 and 10 mols of ethylene oxide was agitated for 10 hours with 280 grams of isobutylene and 100 grams of Amberlyst 15. The product, 2-octyl $E_{10}$-t-butyl ether, was separated from the beads, neutralized with a little sodium carbonate and was then stripped to recover excess isobutylene. Six hundred twenty-six grams of a light colored oil was obtained. It did not discolor on alkali.

EXAMPLE 24

A reaction product of iso-octyl alcohol and 10 mols of ethylene oxide was etherified with isobutylene in the manner described in Example 23. The product, iso-octyl-$E_{10}$-t-butyl ether, did not discolor on alkali.

Iso-octyl alcohol is a commercial branched chain 8-carbon primary alcohol prepared by the hydroformylation of mixed heptenes.

EXAMPLE 25

Four hundred fifty-eight grams (1.0 mol) of a reaction product of para-t-butylphenol and 7 mols of ethylene oxide was treated with isobutylene as described in Example 10. The product did not discolor on solid NaOH.

EXAMPLE 26

In a one-liter, three necked flask equipped with a thermometer, an agitator, and an inlet for a slow stream of $N_2$ were heated 131 grams (0.1 mol) of a reaction product of one mol octylphenol with 25 mols of ethylene oxide, 250 grams of Amberlyst 15 and 136 grams (11 mols) of camphene. After 72 hours at 65–70° C. the product was separated from the catalyst beads. The beads were washed once with alcohol to remove additional product. The product was an amber oil which solidified at room temperature to a soft wax. It weighed 1400 grams. A comparison of properties with $OPE_{25}$ follows.

|   | $OPE_{25}$ | $OPE_{25}$ isobornyl ether |
|---|---|---|
| Hydroxyl Number | 43 | 2.3. |
| Cloud point (1% in water) | >100 | 4° C. |
| Stability (2% in solid NaOH) | Discolors | White. |

EXAMPLE 27

A reaction product of octadecanol-1 with 35 mols of ethylene oxide was converted to the isobornyl ether by the method described in Example 26. The product had a hydroxyl number of 3.2 and contained about 11 percent by weight of unetherified starting material. It discolored slightly on NaOH.

EXAMPLE 28

A reaction product of octylphenol and 16 mols of ethylene oxide (91.0 grams) was heated with 136 grams of α-pinene in the presence of 13 grams of Amberlyst 15 for 48 hours at 30–40° C. At the end of this time the product was separated from the catalyst beads, neutralized to pH 7.0, and stripped to remove unreacted α-pinene. Analysis of the stripped product indicated that it was 39% terpenyl ether of $OPE_{16}$ and 61% unreacted $OPE_{16}$.

EXAMPLE 29

Treatment of $OPE_{16}$ with di-limonene in the same manner as in Example 28 gave a product containing by analysis 27% of a terpenyl ether of $OPE_{16}$ and 73% unreacted $OPE_{16}$.

We claim:
1. The process comprising mixing together a compound having the formula $RO(CH_2CH_2O)_xOH$ with a tertiary olefin hydrocarbon having from four to twelve carbon atoms, the ratio of the two being at least two moles of the olefin per mole of alcohol, contacting the mixture with an anhydrous macro-reticular resinous polysulfonic acid at a temperature ranging from about 0° to 70° C. and at a pressure ranging from autogenous to atmospheric, and isolating the resulting ether, the R in the formula being a hydrocarbon radical selected from the group consisting of (1) straight and branched chain $C_8$–$C_{18}$ alkyl radicals, and (2) straight and branched alkenyl radicals, and (3) mono and dialkylphenyl radicals containing 10 to 24 carbon atoms, and the $x$ in the formula being a number from 7 to 50, inclusive.

2. The process of claim 1 in which the alcohol is an octylphenol-ethylene oxide$_{16}$ adduct and the olefin is isobutylene.

3. The process of claim 1 in which the alcohol is a stearyl-ethylene oxide$_{30}$ adduct and the olefin is isobutylene.

4. The process of claim 1 in which the alcohol is a dodecylphenol-ethylene oxide$_{28}$ adduct and the olefin is camphene.

5. The process of claim 1 in which the alcohol is an octylphenol-ethylene oxide$_{12.5}$ adduct and the olefin is isobutylene.

6. The process of claim 1 in which the alcohol is a nonylphenol-ethylene oxide$_9$ adduct and the olefin is isobutylene.

7. The process of claim 1 in which the alcohol is an octylphenol-ethylene oxide$_{16}$ adduct and the olefin is alpha-methylstyrene.

References Cited by the Examiner

UNITED STATES PATENTS

| | | | |
|---|---|---|---|
| 2,480,940 | 9/1949 | Leum et al. | 260—614 |
| 2,596,092 | 5/1952 | Benneville | 260—611 |
| 2,841,621 | 7/1958 | Riley | 260—615 |
| 2,856,434 | 10/1958 | Niederhauser et al. | 260—613 |
| 2,905,719 | 9/1959 | Benneville et al. | 260—615 X |
| 2,905,720 | 9/1959 | Benneville et al. | 260—613 X |
| 2,905,721 | 9/1959 | Benneville et al. | 260—615 X |

FOREIGN PATENTS 770,073    3/1957    Great Britain.

OTHER REFERENCES

Evans, et al.: Industrial and Engineering Chemistry, vol. 28 (1936), pp. 1186–1188.

LEON ZITVER, *Primary Examiner.*

B. HELFIN, *Assistant Examiner.*